United States Patent [19]

French

[11] Patent Number: 4,824,107

[45] Date of Patent: Apr. 25, 1989

[54] SPORTS SCORING DEVICE INCLUDING A PIEZOELECTRIC TRANSDUCER

[76] Inventor: Barry J. French, 30612 Salem Dr., Bay Village, Ohio 44140

[21] Appl. No.: 904,356

[22] Filed: Sep. 8, 1986

Related U.S. Application Data

[63] Continuation-in-part of Ser. No. 785,969, Oct. 10, 1985, Pat. No. 4,761,005.

[51] Int. Cl.⁴ .................... A63B 67/00; A63B 69/00
[52] U.S. Cl. .................. 273/1 GC; 273/1 E; 272/76; 272/77; 310/318; 310/800; 73/862.59
[58] Field of Search .............. 272/76, 77; 273/1 GC, 273/1 GE, 181 R; 128/25 R, 25 B; 310/318, 800; 73/862.59

[56] References Cited

U.S. PATENT DOCUMENTS

| | | |
|---|---|---|
| Re. 32,180 | 6/1986 | Lewiner et al. |
| 2,916,287 | 12/1959 | Davey |
| 3,239,696 | 3/1966 | Burkhalter et al. |
| 3,302,214 | 2/1967 | Yuritch |
| 3,323,367 | 6/1967 | Searle |
| 3,580,575 | 5/1971 | Speeth |
| 3,604,958 | 9/1971 | Palini |
| 3,750,127 | 7/1973 | Ayers et al. |
| 3,798,474 | 3/1974 | Cassand et al. |
| 3,866,909 | 2/1975 | DeSantis |
| 3,920,242 | 11/1975 | Reith et al. |
| 3,935,485 | 1/1976 | Yoshida et al. |
| 3,970,862 | 7/1976 | Edelman et al. |
| 4,054,806 | 10/1977 | Tanaka |
| 4,088,315 | 5/1978 | Schemmel |
| 4,166,229 | 8/1979 | DeReggi et al. |
| 4,216,403 | 8/1980 | Kremple et al. |
| 4,254,951 | 3/1981 | DeLaney |
| 4,304,126 | 12/1981 | Yelke |
| 4,328,441 | 5/1982 | Kroeger, Jr. et al. |
| 4,343,469 | 8/1982 | Kunita et al. ............ 273/85 G |
| 4,413,202 | 11/1983 | Krempl et al. |
| 4,419,599 | 12/1983 | Micheron |
| 4,432,545 | 2/1984 | Vanderpool |
| 4,443,730 | 4/1984 | Kitamura et al. |
| 4,499,394 | 2/1985 | Koal |
| 4,516,112 | 5/1985 | Chen |
| 4,555,953 | 12/1985 | Dario et al. |
| 4,556,998 | 12/1985 | Slepser |

FOREIGN PATENT DOCUMENTS 267403 12/1970 U.S.S.R.
2151371 12/1984 United Kingdom.

OTHER PUBLICATIONS

"Stikometer" advertisement appearing in Black Belt Magazine, Apr. 1984.
"Solev PVDF Biaxially Oriented Piezo and Pyroelectric Films for Transducers" Made available at a meeting called Transducer '85, Philadelphia, Pa. on Jun. 11 and 12, 1985.
Advertisement from Apr. 1984 isue f "Black Belt" magazine, showing a type of fixedly mounted ficking target whose function is said to be measuring the peak force of your blow.

Primary Examiner—Maryann Lastova
Attorney, Agent, or Firm—D. Peter Hochberg; Mark M. Kusner; Louis J. Weisz

[57] ABSTRACT

Disclosed is a device for generating an analog output signal indicative of an impact to a transucer. The tranducer may be mounted on protective equipment utilized in various martial arts fields, such as headgear, hand or footgear, protective vests and the like or can be mounted on training equipment, such as a heavy bag, striking pad, etc. In a preferred embodiment the transducer is a piezoelectric film which, upon deformation, generates an electrical signal which is indicative of the amount of deformation. By placing the piezoelectric film on top of a deformable material, in a preferred embodiment sandwiching it in the deformable material, impacts to the deformable material will strain the piezoelectric film generating the signal output. In a further embodiment of the present invention, the piezoelectric transducer is mounted on a target pad and provides an analog output indicative of the characteristic of an object impacting the target pad, i.e., baseball, softball, tennis ball, hockey puck, golf ball, etc. For use in the martial arts, the transducer may be connected to a transmitter and remote receiver for providing an indication of the impact at a remote location. In further preferred embodiments, the transucers may be mounted on one participant's headgear so as to provide an indication of impacts delivered to that participant by another participant in the sport or mounted on the hands or feet of the participant to provide a signal by means of a flexible transducer mounted on the hand or foot, thus providing an indication of a flow delivered to another party.

13 Claims, 5 Drawing Sheets

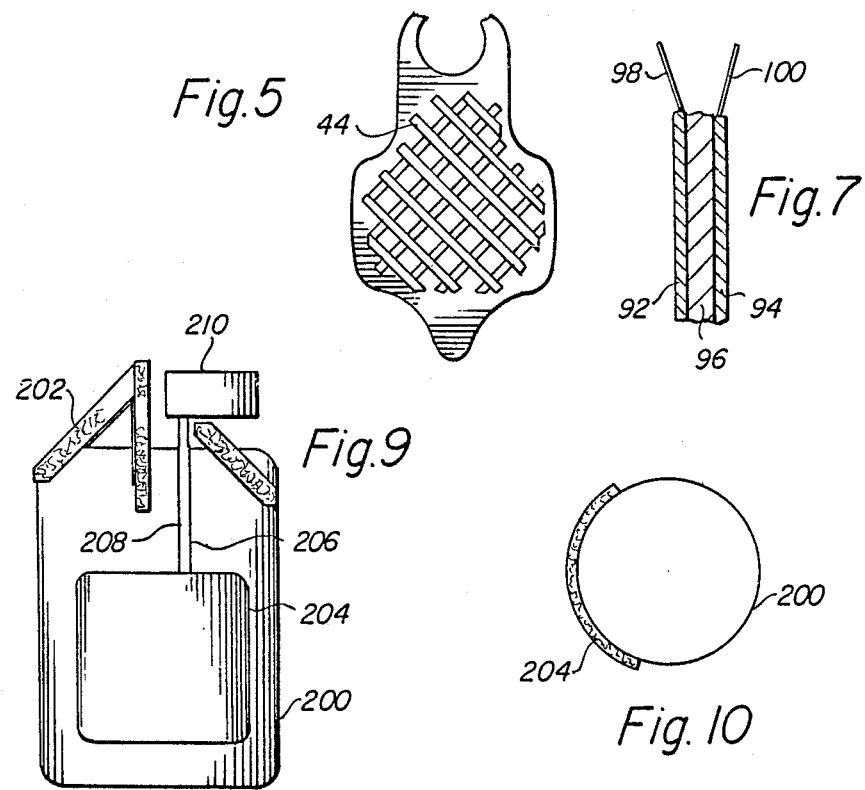
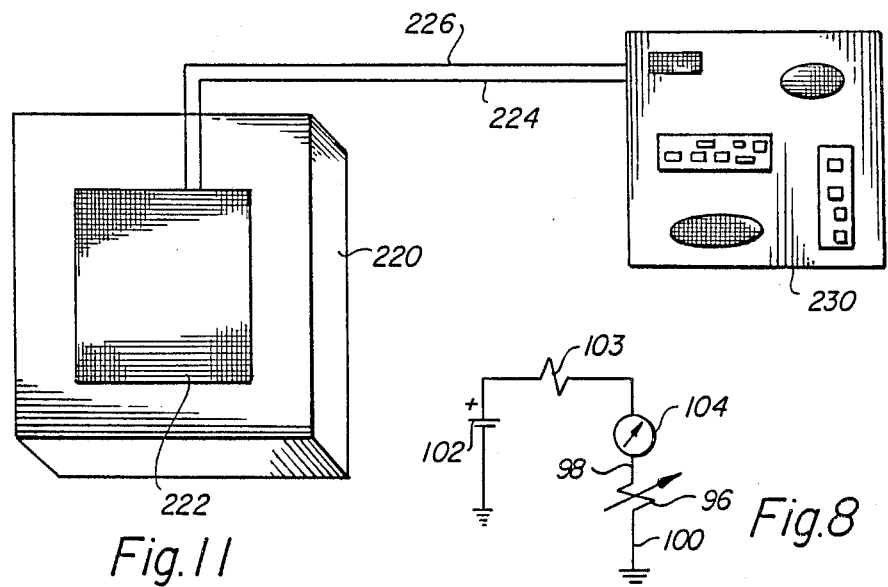

SPORTS SCORING DEVICE INCLUDING A PIEZOELECTRIC TRANSDUCER

This is a continuation-in-part of application Ser. No. 785,969, filed Oct. 10, 1985, now U.S. Pat. No. 4,761,005.

TECHNICAL FIELD

This invention relates generally to the field of evaluating performance in physical contents involving body maneuvering, and more specifically to scoring in matches between practitioners of the martial arts.

BACKGROUND ART

Martial arts such as karate, kung-fu, tae-kwon do, kick-boxing, boxing, and others, enjoy increasing popularity as physical sports and mental disciplines. Many of these martial arts are the present day successors to ancient forms of hand to hand combat practiced in various regions of the Orient.

Today, the competitive asects of these martial arts are generally practiced by fighters in a ring (with or without ropes on the perimeter) similar to the type used in boxing.

These martial arts employ, in both their training regime and competition matches, full-contact contest formats, or non-contact or light contact (controlled) sparring sessions, with opponents of approximately equal experience and weight. This training must be done on a regular basis to be effective in developing the requisite skills to defend oneself in a self-defense situation or to perform optimally in an organized competition.

In the non-contact or light contact modes of sparring practice, martial arts such as karate, kung-fu, etc., differ from professional boxing. In practice of these martial arts, offensive "techniques", i.e., attach moves, are executed or "delivered" toward an opponent's body with full power and speed. They are, however, ideally controlled, "pulled" or stopped just short of actual physical contact, or upon only light contact, depending on applicable rules of the composition. This restraint is not only employed because of the great potential for serious injury that can result from a skillfully delivered unrestrained martial arts technuique, but also because this precise control demonstrates mental discipline and physical prowess on the part of the combatant.

A point may be awarded to a fighter when he or she delivers an unblocked attach or technique to the neighborhood of a designated legal target or "vital" area of the opponent's body, with sufficient speed, power and form to be adjudged to potentially cause damage to the opponent's body if not controlled. Vital areas include the kidneys, solar plexus, face, groin, etc. An added requirement is that a point will be awarded only when a technique threatens a designated vital or target area with impact by a predetermined "designated hitting surface" of the attacking fighter's body. Designated hitting surface areas include for example the first two knuckles of a closed first, the side of the hand, and the ball of the foot.

Excessive contact in delivering a technique in non-contact or light contact matches can cause a fighter to be disqualified, or be denied points, for that technique.

A problem created by non-contact or light contact sports, such as these controlled martial arts sparring exercises, is that accurate scoring is predicated on the subjective evaluation of an exchange of techniques between the fighters, either by the fighters themselves, or by as many as five experienced judges, strategically positioned in tournament matches at corners of the ring and within the ring itself. Dependence on this subjective judgment sometimes results in improperly awarded points, missed points, excessive contact (by a participant attempting to forcefully "record" his point unmistakably for the judges) and in second punching by the defending fighter because he ignored, by design or accident, his opponent's scoring technique.

Martial arts fighters can maneuver their bodies and deliver attacks or techniques toward their opponents with extreme speed in flurries of action. The degree of this speed amplifies the difficulty in determining when points are scored. Even where several officials are employed to judge a match, visual identification of scoring maneuvers is difficult. Disagreement between officials often occurs, due to inequality of perspective enjoyed by the various officials. Moreover, visual acuity may vary among officials, and even, over time, in the same official.

Participatents in the sports of Professional Boxing, Professional Karate and Kickboxing, etc. deliver their techniques with full power and speed in competative matches with the goal of rendering their opponent temporarily incapacitated. A scoring system based on the visible accumulation of damaging blows represents one mode of measuring the effectiveness of a fighter's technique. The rigorous nature of such contests limits participation and offers potential for injury to the combatants. Full contact matches that end without a knockout or TKO are subject to subjective scoring as are the non-contact and light contact matches.

Martial arts practitioners in increasing numbers wear protective garments including padding that covers the fighters' designated hitting areas, such as the hands and feet. Such protective garb is very popular as a means of preventing injuries due to accidental contact. Their use is mandated in the great majority of tournaments in the United States and Canada.

An interesting, but crude, proposal has been made in the hope of improving scoring accuracy in martial arts matches. According to this proposal, each fighter wears a vest-like garment like numerous pockets, each pocket being positioned over a vital area of the fighter's body. Inflatable components, resembling balloons, are placed in the pockets. When the opposing fighter delivers a technique to the neighborhood of a vital area, the corresponding balloon is struck and is said to burst, indicating that the technique was in fact delivered to the neighborhood of the associated vital area.

A significant problem with this proposal is that, once a balloon bursts, it can indicate no further results of action. With this proposal, the fight must be stopped after each point and a new balloon inserted into the appropriate pocket. Such a limitation renders impractical the proposed system.

Another disadvantage of the proposed system is that while it can indicate when a vital area is contacted, it cannot distinguish between hits utilizing designated hitting areas and hits made with non-scoring other parts of the attacking fighter's body.

Further disadvantages in the proposed system are that the actual force of each blow is not quantitatively measured and no provision is made for participants who prefer sparring without the requirement of receiving or delivering contacting blows.

A general object of this invention is the provision of a method for accurate, repeatable, quantitative measurement of the actual force of a blow that a fighter receives to his legal target area. Similar objects are envisioned in training implements generally to indicate the force generated by the execution of techniques on or by use of the implement during practice. It is a further object to provide indication of the velocity, force and/or energy of impacts on a training device.

SUMMARY OF THE INVENTION

The disadvantages of the prior art are reduced or eliminated, in one embodiment of the invention, by a system for assisting in scoring in a physical contest involving bodily contact between two contestants, wherein the occurrence of bodily contact affects scoring. "Bodily contact" includes both striking by a part of another contestant's body and striking with an implement. The system includes an electromechanical transducer detector and means for mounting at least a portion of the detector proximate the body of a first contestant. The detector is coupled to means for producing an indication in response to application of force to the detector.

Such a system thus incorporates a transducer for translating physical force applied to the region of the transducer to electrical signals, which are used to provide a repeatably and accurate reflection of the delivery of blows by one contestant to the body region of another.

In a more specific embodiment, the transducer produces a signal having a value which is a function of the amount of force applied in delivery of the blow. Such a system enables the objective evaluation of the force, and efficacy, of the applied blow.

In another specific aspect, the transducer is mounted on or incorporated into a garment to be worn by one of the contestants. The transducer can thus be fixed to be positioned proximate only a "vital", or valid scoring target area of the wearer contestant's body. Accordingly, the transducer will react to blows impinging in the region of the target area, and will not react to blows delivered to other, non-scoring areas of the contestant's body.

According to another specific feature, the garment to which the detector is affixed comprises a vest at least partially made of protective foam padding. In this manner, the scoring detector system can be incorporated into a garment which provides effective protection and insulation from blows which might otherwise harm a contestant.

In accordance with a further specific feature, the detector comprises a portion of piezoelectric film. When the piezoelectric film is struck, as with a blow delivered toward the wearer contestant's body, the film produces an electrical voltage signal between the sandwiching conductive layers, which can be detected and utilized to provide a tangible indication of the occurrence and/or the force of the blow.

In accordance with a further specific embodiment, the system includes a radio transmitter electrically coupled to the detector, also mounted proximate the body of the wearer contestant, in combination with a radio receiver for detecting blow-indicating transmission from the transmitter at a relatively remote location, such as at a scorer's table or the like.

The receiver is optimally coupled to display and/or recording apparatus for providing tangible audible or visual indications and/or recordings of the occurrence and force characteristics of blows delivered to the contestant wearing the detector. The detector can be worn on a protective vest and/or headgear to indicate the characteristics of an impact delivered to a person or can also be worn on a glove or protective footgear to indicate the impact delivered by that person.

The principles of the scoring detection unit can also be incorporated in practice apparatus for use in martial arts training by a single participant executing training maneuvers. Such an apparatus for training includes an object suitable for absorbing blows, and an electromechanical transducer mounted in or on the object to receive and respond to impact from such a blow. Means is coupled to the transducer for indicating the occurrence and/or force of the blow to the region of the striking object proximate the transducer.

By use of such an apparatus, a person training for physical competition can effectively evaluate, or have evaluated, the force of blows he delivers to the striking object, and thereby monitor his or her progress in learning to deliver to the object blows of greater force and accuracy.

In specific embodiments, the striking object can include a light or heavy punching bag, a so-called "hitting pad" mounted on a wall or other stationary fixture, for striking by a martial arts or other sports participant during training, or other sports training device, such as a football blocking dummy or sled.

In accordance with a more specific embodiment of both the contact sensing contestant-worn detector, and of the training apparatus described above, means is provided for distinguishing among blows of different characteristics. In accordance with this specific embodiment, a differentiator is coupled in series between the electromechanical transducer and the transmitter. This equipment, the system responds preferentially to sharp blows causing the generating of fast rising electrical signals. A peak detector can optionally be provided, such that the system will react to only signals having amplitude above a predetermined minimum. This embodiment thus discards blows which are glancing scratching or brushing in nature, and which are generally characterized by relatively low amplitude and sometimes by low frequency in the electrical signals generated by the transducer in response to such blows.

In a further embodiment, a detector is mounted in a target pad and measures the impact characteristics of various objects striking the pad. This could indicate velocity of a tennis ball, golf ball, hockey puck, etc. although a preferred embodiment indicates the velocity of a baseball or softball.

BRIEF DESCRIPTION OF THE DRAWINGS

These and other features of the present invention will become apparent from study of the following specific description, and of the drawings, in which:

FIGS. 4 and 5 are pictorial illustrations of a variant of the embodiment of FIGS. 1-3;

FIGS. 7 and 8 are schematic drawings illustrating a portion of the circuitry shown in block form in FIG. 6;

FIGS. 9 and 10 are side and top views of a heavy bag embodiment;

FIG. 11 is a perspective view of a striking pad embodiment of the present invention;

DETAILED DESCRIPTION OF PREFERRED EMBODIMENTS

Contact Scoring Embodiment

Figure 1:
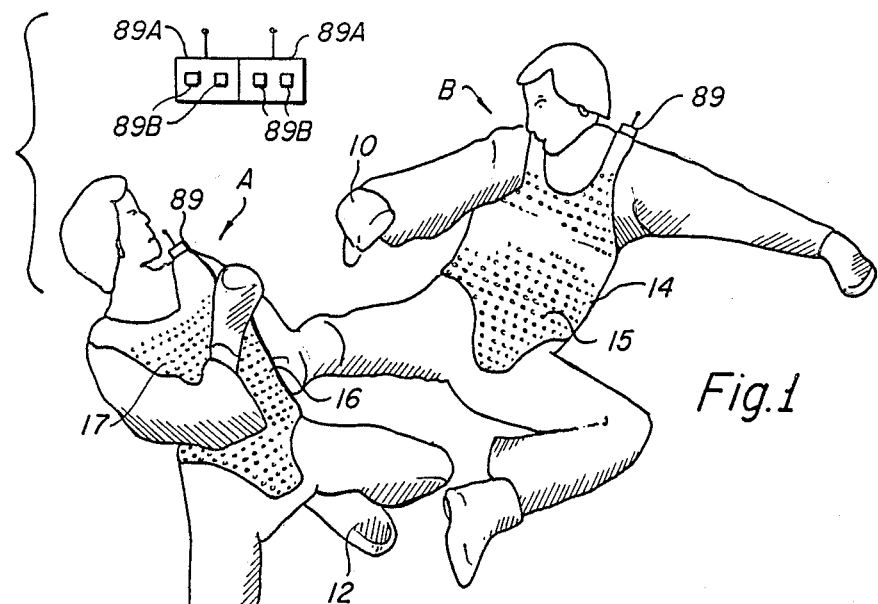
FIG. 1 is a pictorial view illustrating a pair of martial arts contestants utilizing an embodiment of the present invention.

FIG. 1 illustrates two contestants A and B engaged in the practice of the martial arts. The contestants A and B are shown maneuvering to deliver martial arts techniques towards each others' bodies by the use of their hands and feet. The hands may be covered by protective gloves, such as 10, and the feet by protective footwear such as illustrated at 12.

Each contestant also wears another garment, i.e., a vest, such as shown at 14 being worn by contestant B and by reference character 16 as being worn by contestant A. The vests 14, 16 incorporate an embodiment of the present invention, which will be described in more detail below.

Figure 2:
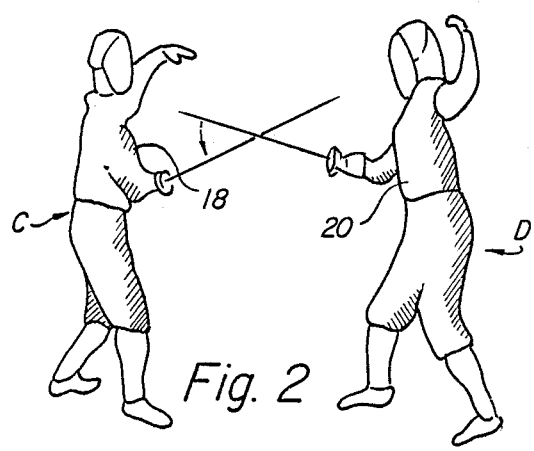
FIG. 2 is a pictorial illustration of a pair of fencers utilizing the embodiment of the invention illustrated in FIG. 1.

FIG. 2 illustrates two other contestants C and D, engaged in the practice of the martial art of fencing. Each of the contestants C and D wears a vest such as illustrated at 18, 20 similar to the vests 14, 16 illustrated in FIG. 1. The use of the present invention can be extended to virtually all contact sports, such as football, etc.

The shaded portions 15, 17 of the vests 14, 16 define force-sensitive active sensing areas and contain components for sensing the force of blows delivered to and contacting those areas of the vests.

Figure 3:
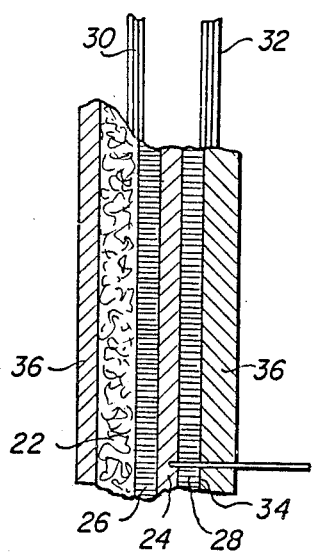
FIG. 3 is a detailed cross-sectional view illustrating a portion of the embodiment of the invention shown in FIG. 1.

FIG. 3 is a cross-sectional view of part of the shaded portion of one of the vests 14, 16. The portion of the vest illustrated in FIG. 3 is of a laminate construction.

Referring to FIG. 3, there is illustrated a layer 22 of protective padding material. The padding material 22 comprises an approximately 1 inch thick layer of relatively dense closed cell foam, of the well-known variety sold under the trademark ENSOLITE.

Also illustrated in FIG. 3 is a layer 24 of piezoelectric film, polyvinylidene fluoride (PVDF), sandwiched between thin metallized layers 26, 28 of electrically conductive metal. The combination of the piezoelectric film layer 24, combined with the two opposed layers 26, 28 of conductive metal are available for purchase as an integral manufactured pliable sheet product known by the trademark KYNAR, manufacture by Pennwalt Corporation, 900 First Avenue, King of Prussia, Pa. 19406, USA.

In the particular embodiment described here, the piezoelectric film is approximately 28 microns in thickness. The metallic layers 26, 28 comprise layers of silver approximately 0.1 microns in thickness. Nickel and aluminum are also satisfactory metallic elements for comprising the layers 26, 28.

Each of the metallic layers 26, 28 is coupled to connecting circuitry by way of respective conductive connection strips 30, 32, which may be made of any suitable conductive metal, such as silver or copper.

The padding material layer 22 is bonded to the metallic layer 26 by means of a suitable non-conductive adhesive material.

The conductive strips 30, 32 are bonded to the respective metallic layers 26, 28 by means of a suitable conducting adhesive interposed between the respective strips and metallic layers.

Optionally, the metallic layer 28 is bonded with non-conductive adhesive to a layer 34 of a strong, pliable plastic material well known and sold under the trademark MYLAR, having a thickness of approximately 0.005 inches. The layer 34 serves to provide physical strength and integrity to the outer facing surface of the assembly described in connection with FIG. 3.

Additionally, an outer protective and decorative coat of vinyl, such as at 36, can be provided on both sides of the vest by means of dipping or spraying.

As illustrated in the FIG. 3 cross section, the protective layer 22 is worn immediately adjacent the body of the contestant. Thus, metallic layer 26 is toward the inside, relative to the piezoelectric layer 24, and layer 28 faces toward the outer portion, away from the wearer's body.

When the assembly of components illustrated in FIG. 3. in cross section is incorporated into the shaded active sensing areas 15, 17 of the vests 14, 16, and the vests are worn by a contestant as described above, contacting blows impinging, from the right as shown in FIG. 3, produce easily detectable electrical signals at the conductive strips 30, 32. The piezoelectric film comprises an electromechanical transducer which responds to mechanical force to produce a voltage between its opposite sides. This voltage is conducted by the metallic layers 26, 28 to the respective conducting strips 30, 32, from which they are transferred to other detection and indicating circuitry which will be described in more detail below.

Tests have shown that, in typical martial arts and other sports practice situations, blows impinging on one human competitor and administered by another, or by an instrument, produce signals at the conductive strips 30, 32 which are of sufficient magnitude to render them easily detectable with relatively simple detection circuitry.

In addition to providing a force sensing or contact sensing function, the structure illustrated in cross section in FIG. 3 also provides a physical protective effect, by virtue of the padding layer 22. Thus, the force sensing scoring system is integrated with the protective garment normally worn by a martial arts contestant, or fighter.

Figure 4:
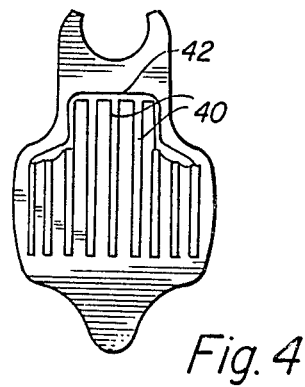

In one embodiment, the entire shaded active sensing areas of the vests as shown in FIG. 1 have incorporated therein a single integral sheet of the KYNAR piezoelectric material, which covers the whole active sensing area. Alternatively, however, as shown in FIG. 4, one can utilize, instead of the single sheet covering the entire expanse of active sensing area, strips 40 of KYNAR material coupled together electrically by the use of copper tape 42 or by patterned electrode metallizations, for good signal generation and economy.

In another embodiment, the sheets can be arranged in a criss-cross matrix pattern, as shown in FIG. 5 at reference character 44. These other embodiments incorporating strips of piezoelectric material can be used to achieve a broad active sensing area without the need for purchase of sufficient amounts of piezoelectric material to actually cover the entire active sensing area, thus reducing cost.

The system of this invention has the capability of registering not only the fact of the delivery of a blow to a contestant's vest active sensing area, but also registering the amount of force generated by administration of the impinging blow due to the piezoelectric material's characteristic of producing electric signals whose amplitude is a function of the force of a blow.

Various types of display and recordation apparatus can be incorporated into, or used in conjunction with, the receiver. For example, a light emitting diode (LED) bar can be used as a display, as can ordinary meters. Alternately, or in addition, to voltage controlled oscillator (VCO) whose generated frequency varies with the amount of voltage input thereto, can be coupled to a speaker and used to emit audible sound in response to the impingement of blows by one contestant upon another. The frequency of the emitted sound, as governed by the voltage controlled oscillator, rises as a function of the amount of force applied in the delivery of a particular blow to which he receiver responds. A means of recording a series of blows comprises a strip chart recorder coupled to or integrated in the receiver in order to produce a lasting representation of the occurrence and force of applied blows plotted against time.

Alternatively, the radio transmitter/receiver arrangement can be omitted, and signals from a sensing vest can be tansmitted to a monitoring loation by conventional conductive leads (not shown) coupled to the conductive strips.

A block diagram describing circuitry for detecting, displaying and recording signals from the conductive strips 30, 32 is described in connection with FIG. 6.

Leads 60, 62 are coupled to the conductive strips 30, 32 and carry signals constituting or corresponding to those generated by the piezoelectric transducer component. The signals from the leads 60, 62 are applied to a front end amplifier 64, which can comprise a MOSFET or JFET amplifier in a voltage follower configuration. The input impedance of this voltage follower can be adjusted so that a signal of the proper voltage level is coupled to the next stage. Its offset voltage is also adjustable to obtain preferably a zero offset voltage. The front end amplifier 64 is designed to match the transducer signals and circuitry to the downstream detector circuitry, and can be readily selected from well known circuitry. This matching capability is desirable because the output from the piezoelectric transducer can vary with conditions of use, such as size and strength of fighters, area of the force applied by a blow, and other factors.

The next stage is an analog transmission gate 66. This stage is optional and would be used when a non-contact sensing mode is used simultaneously with the contacting sensing mode. The gate 66 is responsive to a gating signal appearing on a lead 68. In an instance of a first signal level at the lead 68, the gate 66 transmits the signals from the component 64 to a lead 70. In the instance of a second condition on the gating signal 68, the gate 66 blocks such signals. The use of the analog transmission gate 66 will be discussed in more detail below.

For the moment, one should assume that the transmission gate 66 remains continuously in its transmissive condition, passing signals from the front end amplifier 64 to the next stage which is a peak detector 67. The peak detector is basically a rectifying circuit that detects the peak voltage of the incoming signal in response to the strength of the blow delivered to the piezoelectric transducer. The voltage output of the peak detector is able to hold in known fashion for a short time to allow the display of the peak value in later stages. The holding time can be adjusted by the time constant of a capacitor and resistor network in the peak detector at the output end. The peak detector 67 is connected to a driver amplifier 68a which provides sufficient power to drive the output channels. Instead of connecting the analog transmission gate 66 directly to the peak detector 67, it is optional to add a differentiator 71 that mainly consists of a capacitor and resistor such that the signal is taken from across the resistor as shown in FIG. 6. The differentiator allows the measurement of the time derivative of the signal and thus is indicative of the velocity of the blow applied.

The lead 70 divides into several parallel channels. In a first channel, the transmitted signal is directed to a voltage comparator 72. The output of the voltage comparator is a function of the difference between the signal applied at the lead 70 and another predetermined threshold value. Only signals exceeding the threshold values are passed on, the other being discarded. The signal from the comparator 72 is directed to an LED driver circuit 74. In such a display, the length of a displayed bar corresponds as a function of the magnitude of the signal appearing at the lead 70, which in turn indicates the force of an applied blow.

Another channel includes an A-to-D converter 77 and an LED driver circuit 78 which is coupled to drive an LED seven-segment display 79. This channel involves the use of a sequence of separate light emitting diodes, the number of diodes being lighted corresponding to the force of an applied blow.

Another channel from the lead 70 is directed to a voltage controlled oscillator (VCO) 82, and subsequently to a power amplifier 84 and speaker 86. The VCO 82 responds to produce an output having a frequency which is a function of the magnitude of the signal at the lead 70. The output of the VCO 82 is amplified by the amplifier 84, and its output applied, in turn, to the speaker 86. The speaker 86 produces an audible signal whose frequency is an increasing function of the signal at the lead 70, and is an increasing function of the force delivered by a contacting blow.

Another output of the lead 70 follows a channel to a recorder apparatus 88. The recorder apparatus 88 is a device for making a permanent record, against time, of the signal appearing at the lead 70. In a preferred embodiment, the recorder 88 constitutes a strip chart recorder of known design and construction.

Another channel of the output at the lead 70 is directed to a radio frequency (RF) transmitter 89. The RF transmitter 89 produces radio frequency signals (either amplitude modulated or frequency modulated) which correspond to and represent the magnitude of the signal appearing at the lead 70. The radio frequency transmitter 89 is a miniature transistorized transmitter which is sufficiently small and light to be mounted on a portion of the vest 14, 16, as shown in FIG. 1, on the upper part of the vest near the rear of the shoulder. A receiver 89a at a remote location could provide a signal representative of the transducer signal to a remote display 89b.

Another channel of the output at the lead 70 is directed to an oscilloscope 90 which can be used to analyze the waveform of the output signal at the lead 70. The oscilloscope can also be conndcted immediately after the analog transmission gate 66 to evaluate the overall waveform of the signal.

The electronic components in the above recited system are well known in the art and can be selected by a person of ordinary skill in the art and from commercially available sources.

FIGS. 7 and 8 illustrate another embodiment of the invention utilizing, instead of the piezoelectric film material, a material having variable resistance characteristics. Such a variable resistance material can comprise a graphite-impregnated foam, or a rubberized material of known type which also exhibits variable resistance characteristics upon mechanical compression.

FIG. 7 illustrates a cross-sectional view of a vest, such as 14, 16, in which such a variable resistance material is employed. The vest, seen in cross-section, includes protective foam layers 92, 94, between which is sandwiched a layer 96 of the variable resistance material. The opposite sides of the variable resisetance material are coated with a thin metallic layer (not shown in FIG. 7) but which is similar to the metallic layers which coat the piezoelectric material described in connection with FIG. 3 above. Electrical leads 98, 100, are coupled respectively to these opposing metallic layers.

FIG. 8 shows an example of a simple series circuit which can be employed to sense the occurrence and/or force of blows directed against the portion of the vest material shown in FIG. 7. An electrical source 102 provides a voltage which extends, by way of a resistor 103 and leads 98, 100, across the variable resistance material 96 of the vest. A current registering device 104 is coupled in series with the leads 98, 100. When a constestant wearing the vest having structure such as shown in FIG. 7 is struck with a blow, the variable resistance layer 96 is compressed, and the resistance between the leads 98, 100 is substantially reduced. This causes an increased in the current flowing through the circuit as shown in FIG. 8, and an increase in the reading shown on the ammeter 104. The output of the ammeter 104 can be employed in a manner analogous to that described above in connection with FIG. 6 to provide an output indicating the occurrence and/or force of a blow, which may easily be monitored by match officials.

Practice Equipment Embodiments

Embodiments of the present invention can be employed in stationary training equipment, as well as in protective garments worn by participants in sports contests. FIG. 9, for example, shows a heavy punching bag 200 suspended from a fixed support by hanging structure 202. The punching bag 200 (shown in top view in FIG. 10) bears a panel 204 which is pressure sensitive, and which embodies the piezoelectric film and electrically conductive layer structure described in FIG. 3 as worn in a competitor's vest.

The panel 204 comprises a portion of piezoelectric film material sandwiched between metallic foil layers, as described in connection with FIG. 3. Leads 206, 208 are connected respectively to the opposite metallic foil layers and are directed to electronic apparatus 210 comprising circuitry and apparatus similar to that described in connection with FIG. 6. The panel 204 is appropriately covered with a protective material to inhibit damage to the layers constituting the panel 204.

When the panel 204 on the punching bag 200 is struck by a fighter practicing his techniques by the use of the bag, an electrical signal is produced at the lead 206, 208 indicating the occurrence and amount of force of the applied blow. This signal is directed to the electronic apparatus 210 which provides, in a manner analogous to that described above, various indications of the occurrence and the force of the applied blow.

FIG. 11 illustrates another type of training device, sometimes known as "striking pad", indicated generally at 220. The striking pad comprises a layer of high density closed cell foam, such as the material known by the trademark ENSOLITE. A rectangular panel 222 is attached to one side of the striking pad. The panel 222 includes a portion of piezoelectric film sandwiched between a pair of metallic foil layers similar to that described in connection with FIG. 3. As in the case of the punching bag 200, the panel 222 is covered with a material suitable for inhibiting damage to the panel. Leads 224, 226 are respectively connected to the metallic foil layers.

The striking pad 220 is commonly mounted to a wall or other fixed structure, and a practicing fighter strikes it with hands or feet in order to practice his technique. When the panel 222 is struck, it produced a signal at the leads 224, 226 indicating the occurrrence and force of the applied blow. The signals at the leads 224, 226 are directed to electronic apparatus 230, also shown generally in FIG. 11. The electronic apparatus 230 includes various types of apparatus and circuitry for providing tangible indication of the occurrence and force of applied blows, similar to those described in connection with FIG. 6, and which can easily be selected and implemented.

Practice equipment analogous to that described here can be employed in virtually all contact sport training equipment, such as football blocking dummies and sleds, pads, baseball bats and gloves, targets of various kinds, lacroses and hockey sticks, and many others.

Figure 12:
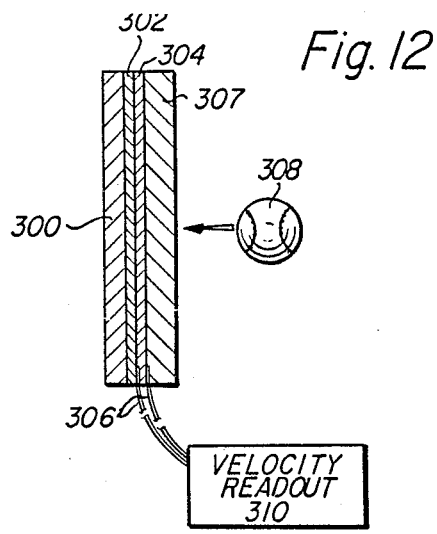
FIG. 12 is a side cross-sectional view of the baseball velocity measurement embodiment.

FIG. 12 illustrates an embodiment of the present invention similar to the "striking pad" of FIG. 11 but designed specifically for the purpose of measuring the velocity of an object, in this instance, a baseball. Obviously this also could be applied to hockey pucks, tennis balls, golf balls, etc. where velocity is a significant parameter to be measured. A preferred embodiment of the baseball velocity measuring device includes a back supporting plate 300 which can be formed from a relatively rigid material, such as an acrylic like LEXAN or steel, where the LEXAN has a thickness of approximately one-fourth to one-half inch. A thin layer of deformable material 302 is fastened to the supporting plate 300 by means of gluing, two-sided tape, etc. The deformable material may be a solid or foamed rubber material, such as SORBOTHANE, in one embodiment, one-eighth inch in thickness.

MYLAR encased piezoelectric film elements 304 are fastened by means of a suitable adhesive or double-sided tape to the thin layer of deformable material 302. While most adhesives or double-sided tape are sufficiently deformable, use of a rubber material in a thin layer is preferred. A solid sheet of piezoelectric film can be utilized or a plurality of mechanically separate, electrically connected piezoelectric film elements can be utilized. Where the baseball velocity measuring pad has a frontal area of twelve inches, transducer strips one inch by ten inches spaced approximately 0.25 to 1.5 inches apart can be employed. The electrical attachment 306 would be provided to a velocity readout 310 or any other suitable measuring and/or recording device 230 as shown in FIG. 11.

A deformation distribution layer 307 can be of a material the same as or different from that in the deformable layer 302, covers the transducer piezoelectric film 304 and is attached by means of a suitable adhesive or two-sided tape. The layer 307 serves to distribute deformation loads over transducer elements in the multiple elements embodiment and serves to dampen secondary variations in the solid sheet embodiment. Optionally a cover of nylon or canvass can enclose the deformable material so as to provide additional protection. It has been found advantageous to utilize transducers having MYLAR protecting film of at least 4 mils in thickness to increse the durability of the piezoelectric film.

When baseball 308 strikes deformable layer 307 the impact deforms the piezoelectric film 304 compressing the thinner deformable layer 302 thereunder. The piezoelectric film generates an output voltage representative of the amount and type of strain that the transducer film undergoes. If this signal is viewed on an oscilloscope it will vary over time. The rate of increase of signal output voltage is indicative of the velocity of the baseball, i.e., how quickly the material is deformed. The peak voltage is the maximum deflection of the piezoelectric film during the impact and is indicative of the force of the impact. It can be seen that the area under the signal versus time curve is representative of the momentum of the baseball and also serves as an accurate indication of velocity since the mass of a baseball is a carefully controlled known. Any suitable readout unit can integrate the output signal of transducer 304 to provide the area under the curve with a suitable calculation to provide a direct velocity readout. By merely changing the conversion factor (based upon the mass of the object) with which the area under the curve information is processed, the device can be easily changed to indicate the velocity of any other object of the mass of that object is known. Thus in one embodiment a multiple position switch could serve to indicate the velocity of a baseball, softball, golf ball, hockey puck or tennis ball with a high degree of accuracy. Tests have indicated that with respect to the baseball embodiment, such a pad is at least as accurate as the more conventional "radar gun" used to record a baseball's velocity. It is believed that the complete target pad and readout device 310 can be marketed for perhaps one-fifth of the cost of a radar gun. Furthermore, separate areas of the target pad could be designated as having a higher or lower value to place a premium on accuracy when used as a training device. Thus if the pitch (in the baseball embodiment) was directly on the bulls eye of the target, this could be indicated. Therefore the embodiment of FIG. 12 is believed to be particularly advantageous in providing an inexpensive, yet highly accurate, means of measuring at least the velocity of an object and particularly useful with respect to measuring the velocity of a thrown baseball.

It should be understood that the embodiment described incorporating piezoelectric film for scoring detection does more than indicate merely gross force applied in the administration of a blow. True, the amplitude of the voltage signal from the transducer is a function of applied force. More information about the blow, however, is indicated by the transducer output voltage signal.

More specifically, the waveform of the transducer output voltage carries information describing the velocity of an incident blow, as well as the duration of contact made by the blow on the recipient. The velocity of the blow is a function of the slope of the leading edge of the waveform produced by the transducer in response to the blow. The greater the slope, the faster the blow is administered.

The duration of the blow is a function of the width of the first positive-going peak of the transducer output signal. The greater the width, the longer the duration. The output waveform thus defines a "signature" of the administered blow. Testing has shown that a legal scoring blow produces a waveform having a particular signature. For instance, a non-scoring blow delivered by, for instance, an elbow, seldom possesses the velocity of a scoring blow administered with a hand or foot. Additionally, the duration of the first peak signal indicates the degree of penetration of the blow.

The described embodiment can be supplemented by the addition of a device to monitor and retain a representation of the delivered blow. Such device can comprise a strip chart recorder, or a known type of oscilloscope such as 90 in FIG. 6, having capability of retaining for a time a display of a detected waveform.

A judge or match official viewing such a display can evaluate the quality of the blow it represents. In full contact matches, an optimum blow is indicated by high force (amplitude) and high velocity (slope). A good blow also possesses a characteristic duration dependent on some physical variables, such as the degree of resiliency of the vest material. Duration should be sufficiently long to indicate sufficient penetration, but not so long as to dissipate its force over an excessive period of time.

One method of providing a benchmark signature indicating a standard for a good blow is to have a fighter of known high skill deliver several blows to a transducer under fighting conditions. The official studies the displayed waveforms and can quantify the attributes identified above. Subsequent blows delivered in actual matches are then compared with the standard for evaluation. Such evaluation can be performed as well with the transducer apparatus used in the practice equipment and contact scoring embodiments.

Figure 6:
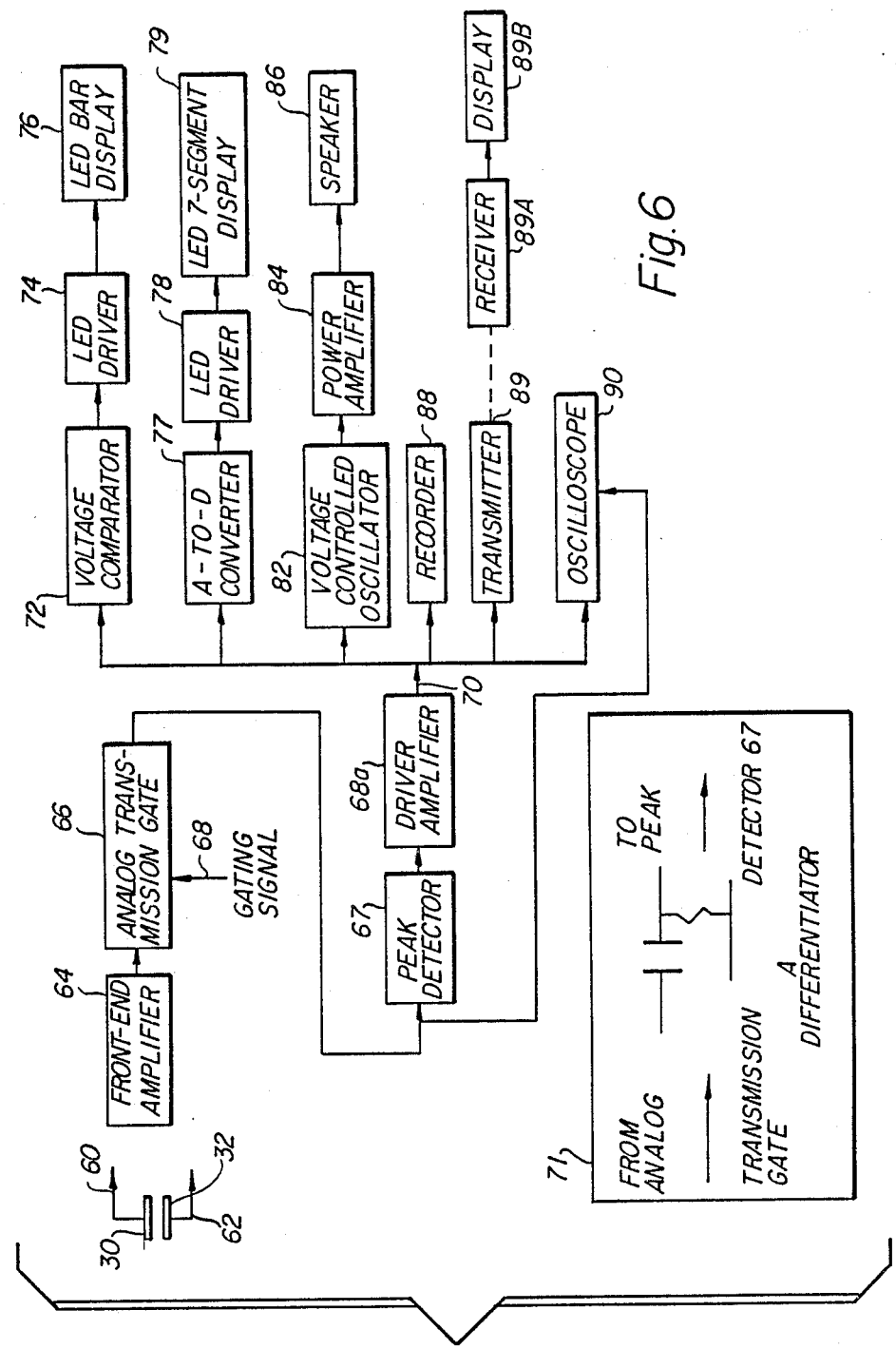
FIG. 6 is a block diagram illustrating details of electrical circuitry incorporated in the embodiment of the invention illustrated in FIGS. 1-3.

The various audio and visual indicators described in FIG. 6, and their power supplies, can optionally be mounted on the fighter's vests and provides a completely portable unit, with no need of remotely located blow indicator elements.

Figure 13:
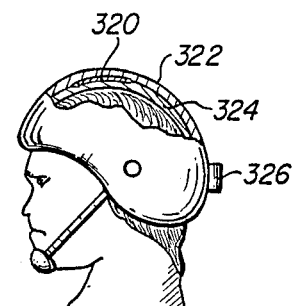
FIG. 13 is a side partial cross-sectional view of protective headgear equipped with an impact monitor.
Figure 14:
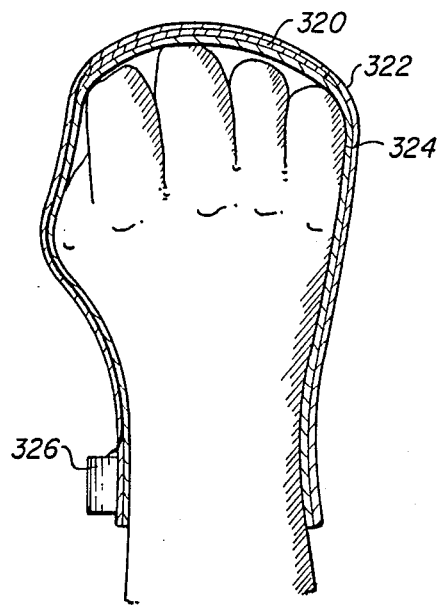
FIGS. 14 and 15 are cross-sectional view of protective gloves and footwear embodiments with impact monitoring devices.
Figure 15:
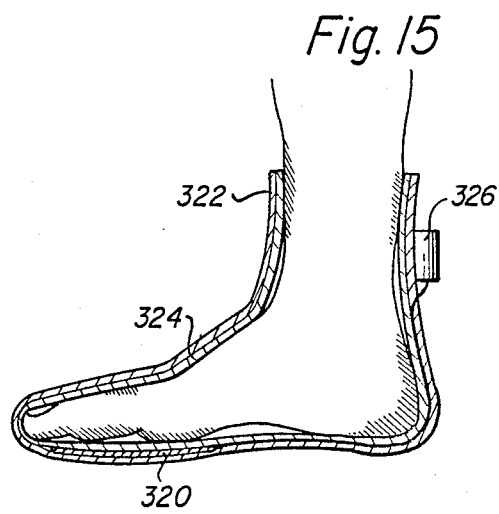

FIGS. 13, 14 and 15 illustrated embodiments of the present invention applied to protective headgear, gloves and footwear, respectively. Each of these embodiments comprise piezoelectric transducer elements 320 sandwiched between layers of shock attenuating foam 322 and 324. With respect to the FIG. 13 embodiment, the location of the transducer 320 would be in designated vital areas of the head. With respect to the protective boxing gloves and/or footwear, the transducer location would be on the legal striking surfaces of the glove or the protective footwear similar to the white portion of an olympic boxing glove. Under these circumstances, only impacts deforming the transducers in the vicinity of these legal striking areas will provide output signals from the transducer.

The protective headgear serves to provide an indication of the velocity and force of impact applied to a contestant's head. By transmitting a signal indicative of the transducer generated signal, an indication of impacts that a contestant is sustaining can be monitored by individuals at a remote location; for example, a medical doctor in a karate or boxing match. If a fighter accumulates a dangerous number of impacts the match can be terminated by the doctor in much the same manner as is currently done by a TKO. The advantage of the present system is that it does not depend upon the contestant's response to establish the likelihood of impending brain damage if the fight continues, i.e., if the contestant has suffered a given amount of impact force to the skull it is not necessary that he appear groggy or dazed to the ring referee. The fight can be terminated by the outside medical doctor, thus preventing or at least reducing the risk of serious injury and death because a fight is not promptly terminated.

The protective glove and footwear in FIGS. 14 and 15 provide indications at remote locations by way of transmitters 326 which are indicative of the impact or force delivered. This would be extremely useful in monitoring the progress of combatants to determine whether they are landing punches (from a scoring standpoint) and/or whether the punches are carrying the desired level of impact (from a training standpoint).

With regard to construction, in preferred embodiments of the headgear and footwear, the inner foam layer 324 is formed or molded from a soft shock attenuating foam such as "SPORTCELL" and is approximately ⅜ inch thick. Individual piezoelectric film elements are mounted on the "vital" scoring area in the headgear and in the legal hitting area of the footwear and in a preferred embodiment can be 1 inch wide and as long as necessary to cover the sensing area. If multiple strips are used they can be spaced approximately ½ inch apart. Lamination can be accomplished with either double-sided tape or adhesive is previously discussed. An outer foam layer 322 in a preferred embodiment is slightly thicker at ⅝ inch and serves to sandwich the transducer therein.

In the glove embodiment, FIG. 14, the foam layers would have thickness of approximately ¼ to ½ inch of foam for each layer with the strips spaced and located in the manner of the sensing headgear and footwear. The transmitter 326 in each embodiment is electrically connected to the transducer 320 and preferably transmits a signal representative of the transducer output to a remote location for subsequent analysis. Such a remote receiver could be similar to that illustrated in FIG. 6.

Thus, in accordance with the above embodiments, the analysis of impacts to a fighter's body or by a fighter to an opponent can serve as a basis for scoring a match as well as for determining a fighter's physical condition. Such devices would also be advantageous during radio and TV broadcasts of boxing and other combat-type matches providing commentators with a virtually instant indication of the strength and effectiveness of individual blows.

In accordance with the above disclosures, it will be obvious to those of ordinary skill in the relevant arts that many modifications, revisions and implementations to the present invention will be obvious. For example, different types of foams, such as Uniroyal's ENSO-LITE product line, RUBATEX 338-V and 310-V line or United Technologies 722.22 and 722.12 line could be used. Various liquid adhesives compatible with MYLAR and vinyl/urethane foams would be suitable along with double-sided tape such as FASTAPE 340 available from Avery International in Painsville, Ohio. Various piezoelectric materials can be utilized although a preferred embodiment utilizes PVDF polymer film that is 28 microns in thickness available from Pennwalt. In preferred embodiments, piezoelectric film transducer elements 1 inch wide in lengths from 3 to 20 inches depending on the length required are available from Pennwalt.

It is to be understood that this description is intended as illustrative, rather than exhaustive, of the invention. Persons of ordinary skill in the relevant art may make certain additions to, deletions from, or changes in the embodiments described in this disclosure without departing from the spirit or the scope of the invention, as set forth in the appended claims.

I claim:

1. An apparatus for indicating velocity with which an object stikes a target pad, said apparatus comprising:
   a fixed backing plate having a front side;
   a layer of deformable material affixed to said front side of said backing plate;
   at least a portion of piezoelectric transducer means affixed to said deformable material for generating an analog output signal in response to the object striking the target pad;
   calculating means, responsive to said along output of said piezoelectric transducer means, for calculating the velocity of said object based upon said analog output and the mass of said object; and
   indicator means connected to said calculating means for indicating the calculated velocity of said object.

2. The apparatus according to claim 1, including a further layer of deformable material covering said first layer and said at least a portion of said piezoelectric transducer means.

3. The apparatus according to claim 1, wherein said object comprises a baseball, said analog output signal is a time varying analog signal, and said calculating means includes means, responsive to the mathematical integral of the analog signal, for computing the velocity of the baseball.

4. An apparatus for indicating the velocity with which an object strikes a target, said apparatus comprising:
   a backing plate;
   deformable material attached to said backing plate;
   a piezoelectric transducer means affixed to said deformable material for generating an analog output signal in response to the object striking the target;
   means for distributing deformation over at least a portion of said transducer means;
   calculating means, responsive to said analog output signal of said piezoelectric transducer means, for calculating the velocity of said object based upon said analog output signal and the mass of said object; and
   indicating means connected to said calculating means for indicating the velocity calculated by said calculating means.

5. An apparatus according to claim 4 wherein said apparatus is adapted to be struck by a projectile or human body part.

6. An apparatus for measuring the value of a characteristic associated with a sports projectile striking a target pad, said apparatus comprising:
   a support;

a deformable material attached to said support;

piezoelectric transducer means affixed to said deformable material for generating a signal reflective of a value when the sports projectile strikes the target pad; and measuring means, responsive to said signal, for measuring said value.

7. The apparatus according to claim 6 wherein said characteristic is the velocity of the object.

8. The apparatus according to claim 6 wherein said characteristic is time related, and said signal corresponds to the amount of deformation of said piezoelectric transducer means and a value which is a function of time.

9. The apparatus according to claim 8 wherein said measuring means is further responsive to the mass of said object.

10. The apparatus according to claim 9 wherein said characteristic is the momentum of the object.

11. The invention according to claim 9 wherein said characteristic is the velocity of the object.

12. The invention according to claim 6 wherein said measuring means includes indicating means for indicating the measured value.

13. An apparatus according to claim 6 wherein said apparatus is adapted to be worn.

* * * * *